United States Patent [19]

Stevens et al.

[11] Patent Number: 5,324,534
[45] Date of Patent: Jun. 28, 1994

[54] METHOD OF MAKING FLAVORED POTATO SLICES

[75] Inventors: John F. Stevens, Richland; Cheree L. Boudreaux, Kennewick, both of Wash.

[73] Assignee: McCain Foods, Inc., Rosemont, Ill.

[21] Appl. No.: 975,828

[22] Filed: Nov. 13, 1992

[51] Int. Cl.$^5$ .............................................. A23L 1/217
[52] U.S. Cl. .................... 426/637; 426/438; 426/441
[58] Field of Search .............. 426/637, 438, 441, 589

[56] References Cited

U.S. PATENT DOCUMENTS

| | | | |
|---|---|---|---|
| 1,354,563 | 10/1920 | Jaeper et al. | 426/589 |
| 2,916,383 | 12/1959 | Nasarevich et al. | 426/589 X |
| 3,968,265 | 7/1976 | Shantila et al. | 426/550 |
| 4,219,575 | 8/1980 | Saunders et al. | 426/242 |
| 4,317,842 | 3/1982 | El-Hag et al. | 426/302 |
| 4,542,030 | 9/1985 | Haury et al. | 426/262 |
| 4,551,340 | 11/1985 | El-Hag et al. | 426/637 |
| 4,559,232 | 12/1985 | Glantz et al. | 426/96 |
| 4,579,743 | 4/1986 | Hullah | 426/262 |
| 4,590,080 | 5/1986 | Pinegar | 426/441 |
| 4,931,296 | 6/1990 | Shanblag et al. | 426/243 |
| 4,931,298 | 6/1990 | Shanblag et al. | 426/296 |
| 5,000,970 | 3/1991 | Shanblag et al. | 426/296 |
| 5,045,335 | 9/1991 | De Rooij et al. | 426/533 |
| 5,059,435 | 10/1991 | Sloan et al. | 426/102 |
| 5,084,291 | 1/1992 | Burrows et al. | 426/637 X |
| 5,141,759 | 8/1992 | Sloan et al. | 426/102 |

FOREIGN PATENT DOCUMENTS

| | | | |
|---|---|---|---|
| 026565 | 4/1981 | European Pat. Off. | 426/637 |
| 105482 | 4/1984 | European Pat. Off. | 426/637 |
| 2195243 | 8/1987 | Japan | 426/438 |
| 1247058 | 10/1989 | Japan | 426/639 |

OTHER PUBLICATIONS

Tioghe, *Woman's Day Encyclopedia of Cookery*, vol. 7, 1966, pp. 1109–1110, Gp 1300.

*Primary Examiner*—Arthur L. Corbin
*Attorney, Agent, or Firm*—Seyfarth, Shaw, Fairweather & Geraldson

[57] ABSTRACT

A flavored potato slice contains even distribution of flavoring, including even distribution of flavoring particles on the surface of the slice. Such potato slice is produced by a process in which the particles are suspended in a marinade in which the raw potato slices are immersed.

21 Claims, No Drawings

METHOD OF MAKING FLAVORED POTATO SLICES

BACKGROUND OF THE INVENTION

The usual way to apply flavoring to a french fry is for the consumer to dip it into flavoring, usually ketchup. Some consumers dip their french fries into salad dressings, taco sauces and the like. This is messy. Also, use of such dips adds cost to the restaurant in which the french fries are served.

There are currently in the marketplace french fries bearing a batter coat containing flavoring. However, such coatings are flour based or gum-starch based and have a high fat content. Also, because the coating tends to be thick, it is visible and, therefore, looks different than a french fry. Finally, the flavoring is only on the outside.

SUMMARY OF THE INVENTION

It is, therefore, an important object of the present invention to provide an improved method of applying flavoring to a potato slice prior to its being received by an establishment which fries them for the consumer.

Another object is to provide an improved such method, whereby the flavoring is evenly dispersed throughout the potato slices and flavoring particles are evenly dispersed over the surface of the slice, such that when finish fried they provide an even and continuous flavor sensation.

The invention consists of certain novel features and a combination of ingredients and steps hereinafter fully described, and particularly pointed out in the appended claims, it being understood that various changes in the details may be made without departing from the spirit, or sacrificing any of the advantages of the present invention.

In summary, there is provided a method of making flavored potato slices comprising the steps of providing potato slices, providing a marinade containing a liquid and a flavoring dispersed in the liquid, said flavoring having flavoring particles, said marinade further containing a binder for maintaining said particles in suspension in said liquid, placing said potato slices in said marinade, and removing said potato slices from said marinade.

DESCRIPTION OF THE PREFERRED EMBODIMENT

In accordance with the present invention, raw potatoes, preferably of the Russet Burbank variety, are cleaned, trimmed and inspected for defects. The potatoes are cleaned using a water flume or spray. The whole potato can be preheated, if desired, to an internal temperature of 90° F. to 150° F. by water or steam to reduce the ragged edge (shattering) that can result during the ensuing cutting step. The potatoes are then cut into slices, such as strips.

The potato slices may be blanched either in water or by steam in order to inactivate enzymes present in the raw potato product which otherwise would cause oxidation. The blanching step gelatinizes the potato cells and also reduces the amount of fat absorbed by the slices during later processing. The step is usually accomplished by placing slices in water at a temperature of 160° F. to 180° F. for 8 to 15 minutes. It is possible to accomplish this enzyme inactivation and starch gelatinization by alternative methods, such as steam blanching at temperatures of 200° F. to 230° F. for a period of 0.5 to 5 minutes. The blanched slices may then be water quenched to remove excess starch and potato slivers that may be adhering to the surface of the potato slices following the blanching step. This step reduces excess starch from being carried into further processing steps. The water quenching step is executed by passing the potato strips through a water bath or by elevating the potato slices on a chain and then spraying the water over the strips using spray nozzles. The water is at 120° F. to 170° F. and the time of exposure is 2 to 30 seconds.

The potato slices are next soaked for about 30 to 75 seconds in a flavor marinade containing 5 to 40% flavoring and having a temperature of about 160° F. to 190° F.

The marinade includes a viscosity stabilizer or binder to keep fine particulate ingredients, such as peppers, herbs, spices and bacon pieces, in suspension. Such binder can be a gum, starch or flour. The marinade preferably contains dextrose and a sequestering salt such as sodium acid pyrophosphate.

The elevated temperature of the marinade increases the efficiency of uptake of flavors by the potato slices since the potato cells absorb the ingredients more efficiently at higher temperatures.

Preferably, soaking the potato slices in marinade is separate from the prior blanching step, although it is possible that both could be performed in a single step.

Preferably, the marinade is kept in a separate tank and is metered to the processing line. This increases the consistency of the flavor being added because it allows dehydrated ingredients that may be present to become fully reconstituted before being introduced to the actual soaking step. Also, it compensates for soak tank/flume dilution effect resulting from water carried on the surface of the potato slices from previous steps. The marinade is agitated with a mixer in the separate tank until needed. The temperature of the marinade is 160° F. to 190° F. and the flavor concentration is 25 to 45% by weight.

After the potato slices are removed from the marinade, they may be dried in hot air at a temperature of 180° F. to 210° F. for 8 to 12 minutes. The drying time will vary depending upon the size of the potato slice. The drying step reduces the weight of the potato slice by 10 to 20%. The drying of the surface helps to bind the flavor which was introduced into the slice in the marinade soaking step. The drying step also enhances the crispness of the surface texture.

That which is in solution in the marinade is evenly distributed throughout the body of the slice while that which is not in solution, namely, the particles of the spices and the like are evenly distributed on the surface of the slice.

Then, the potato strips are parfried in hot oil at a temperature of about 360° F. for about 40 to 70 seconds. Parfrying increases the solids content of each slice by causing it to lose moisture and absorb oil. Parfrying is continued for a period of time sufficient to cause the slices to have a solids content preferably within the range of 24 to 45% depending upon their size. The slices will have an oil content of 1 to 14% by weight also depending upon their size. Flavor content will be between 2 to 10%. The slices are next frozen and packaged for storage and shipment.

The frozen-parfried potato slices are reconstituted by finish frying them, at food service operations, in oil at a temperature of about 350° F. Finish frying time is about 2 to 4 minutes. The resulting french fries will have a solids content of 45 to 70% by weight, including the flavoring ingredients and about 3 to 22% oil. Alternatively, the frozen-parfried potato slices can be reconstituted by finish baking them in a conventional or microwave oven. When conventional ovens are used, the product is normally baked at a temperature of 400° F. to 460° F., for 18 to 24 minutes. Microwave reconstitution is accomplished at a high power setting for 2 to 4 minutes.

Preferably, the potato slices are strips of one of three sizes: 1/4"×1/4", 3/8"×3/8" or 3/8"×1/4" although other shaped potato slices could be used.

The following examples are provided to illustrate and explain the present invention in terms of the best modes for carrying it out now known. These examples are not intended to be limiting in any regard. Unless otherwise indicated, all parts and percentages are based upon the weight of the raw potato prior to frying.

The lemon pepper marinade contains certain ingredients which precipitate out readily, such as the spices and garlic. Similarly, the Cajun marinade contains garlic and spices which also tend to precipitate out of the mixture. In order to keep these ingredients in suspension in the marinade, each of these two marinades has a binder which keeps the particles in suspension. In the particular examples following, the binder is a corn starch. As a result, the particles are evenly dispersed on the surface of the potato slices. Such even distribution of the spices produces an even and continuous flavor and appearance to the finish french fry.

EXAMPLE 1

Peeled and unpeeled raw, cleaned Russet Burbank potatoes cut into 1/4"×1/4" strips, 3/8"×3/8" strips and 3/8"×1/4" strips. Six pounds of strips were placed into a perforated metal basket and were water blanched at 167° F. for 11 minutes. The strips were then placed in a marinade at a temperature of 165° F. (for 55 seconds when the strips were 1/4"×1/4", for 70 seconds when the strips were 3/8"×3/8" and 60 seconds when the strips were 3/8"×1/4").

Five marinades were prepared as follows:

A. Cajun. About 78.4% water, 0.8% sodium acid pyrophosphate, 0.8% dextrose, the balance being salt, garlic, natural flavor, corn starch, spices, yeast and Cajun flavor.

B. Salt & Vinegar. About 78.4% water, 0.8% sodium acid pyrophosphate, 0.8% dextrose, the balance being salt, vinegar, sugar and citric acid.

C. Bacon. About 83.4% water, 0.8% sodium acid pyrophosphate, 0.8% dextrose, the balance being salt, sugar, hickory smoke flavor, artificial bacon flavor, natural bacon flavor and autolyzed yeast extract.

D. Onion & Garlic. About 78.4% water, 0.8% sodium acid pyrophosphate, 0.8% dextrose, the balance being color, salt, onion, spices and garlic.

E. Lemon Pepper. About 78.4% water, 0.8% sodium acid pyrophosphate, 0.8% dextrose, the balance being salt, spice, corn starch, citric acid, lemon juice (corn syrup solids, lemon juice solids, lemon oil), onion and garlic.

The potato strips were then placed in a conventional forced air dryer for 8 minutes at 200° F., resulting in 10 to 25% reduction in weight. The partially dehydrated strips were then parfried in a conventional deep fat fryer at 360° F. (for 50 seconds when the strips were 1/4"×1/4" strips, for 70 seconds when the strips were 3/8"×3/8" strips, and for 65 seconds when the strips were 3/8"×1/4"). The strips were then frozen at −10° F. in a conventional blast freezer. The frozen parfried strips contained an average of 5.21% fat, 33% solids and 4.5% flavor.

The frozen parfried potato strips were reconstituted in a deep fat fryer at 360° F. (for 2½ minutes when the strips were 1/4"×1/4" strips, for 3 minutes when the strips were 3/8"×3/8", and for 2½ minutes when the strips were 3/8"×1/4"). The resultant french fries had desirable colors with visual specks of flavor, and spice pieces. The fries had a crisp outside, and a moist interior texture. The french fries gave a heavy flavor impact throughout.

EXAMPLE 2

Raw, cleaned Russet Burbank potatoes were preheated for 18 minutes in a water bath at 120° F., and were cut into 3/8"×3/8" strips. The strips were water blanched for 20 minutes at 167° F. The strips were next water-quenched at 140° F. for 7 seconds. The strips were then placed in a marinade, for a period of 70 seconds, at a temperature of 165° F., containing about 78.4% water, 0.8% sodium acid pyrophosphate, 0.8% dextrose, the balance being salt, natural flavor, sugar and citric acid. The strips were then air dried at 210° F. for 11 minutes, resulting in a 15 to 18% loss of weight. The partially dehydrated strips were then parfried at 370° F. for 55 seconds and frozen at 5° F. in a conventional blast freezer. The frozen-parfried potato strips contained an average of 6.3% fat, 34% solids, and 4.8% flavor.

The strips were reconstituted by deep fat frying at 360° F. for 3 minutes. The fries had a crisp outside and a moist interior. The french fries had a heavy vinegar flavor throughout.

EXAMPLE 3

Cleaned Russet Burbank potatoes Were preheated for 18 minutes in a water bath at 120° F. and were cut into 3/8"×1/4" strips. The strips were water blanched for 20 minutes at 167° F. The strips were then water quenched at 140° F. for 7 seconds. The strips were placed for 70 seconds in a marinade at a temperature of 165° F., containing about 83.2% water, 0.8% sodium acid pyrophosphate, the balance being salt, sugar, natural hickory smoke flavor, artificial bacon flavor, natural bacon flavor and autolyzed yeast extract. The marinade was metered into the processing tank. The strips were then air-dried, parfried, frozen and reconstituted as in Example 2. The frozen-parfried potato strips had basically the same 4.8% flavor content.

What has been described, therefore, is an improved potato slice having even distribution of flavoring. A method has been disclosed to ensure such even distribution by suspending particles in the marinade used to make the flavored slices.

What is claimed is:

1. A method of making flavored potato slices comprising the steps of providing potato slices, providing a marinade containing a liquid and a flavoring dispersed in the liquid, said flavoring having flavoring particles, said marinade further containing a binder for maintaining said particles in suspension in said liquid, placing said potato slices in said marinade, and removing said potato slices from said marinade, said marinade having a composition so as to be absorbed by said potato slices and to be substantially evenly dispersed throughout said slices.

2. The method of claim 1, wherein said potato slices are strips.

3. The method of claim 1 and further comprising the step of first peeling said potato slices.

4. The method of claim 1, and further comprising the step of blanching said potato slices prior to being placed in said marinade.

5. The method of claim 4, wherein the step of blanching is performed using water.

6. The method of claim 4, wherein the step of blanching is performed using steam.

7. The method of claim 4, and further comprising the step of water quenching said potato slices after said step of blanching.

8. The method of claim 4, and further comprising the step of air drying said potato slices after they are removed from said marinade.

9. The method of claim 8, and further comprising the step of parfrying said potato slices after they are dried.

10. The method of claim 9, and further comprising the step of freezing said potato slices after they have been parfried.

11. The method of claim 1, wherein said potato slices are placed in said marinade for 30 to 70 seconds.

12. The method of claim 1, wherein said flavoring is Cajun.

13. The method of claim 1, wherein said flavoring is lemon pepper.

14. The method of claim 1, and further comprising the step of air drying said potato slices after they are removed from said marinade.

15. The method of claim 14, and further comprising the step of parfrying said potato slices after they are dried.

16. The method of claim 15, and further comprising the step of freezing said potato slices after they have been parfried.

17. The method of claim 1, and further comprising the step of parfrying said potato slices after they are removed from said marinade.

18. The method of claim 17, and further comprising the step of freezing said potato slices after they have been parfried.

19. The method of claim 1, wherein said marinade also includes spice, corn starch, citric acid, lemon juice, onion and garlic.

20. The method of claim 19, wherein said lemon juice contains corn syrup solids, lemon juice solids and lemon oil.

21. The method of claim 1, wherein said marinade also includes garlic, natural Cajun flavoring, corn starch, spices and yeast.

* * * * *